(12) United States Patent
Eistein et al.

(10) Patent No.: US 12,489,496 B2
(45) Date of Patent: Dec. 2, 2025

(54) INTERFERENCE REJECTION COMBINING USING PRECODING RESOURCE GROUP PARAMETER

(71) Applicant: QUALCOMM Incorporated, San Diego, CA (US)

(72) Inventors: Yaniv Eistein, Tel Aviv (IL); Ronen Shaked, Kfar Saba (IL); Aviv Regev, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/490,411

(22) Filed: Oct. 19, 2023

(65) Prior Publication Data
US 2025/0132791 A1   Apr. 24, 2025

(51) Int. Cl.
| | | |
|---|---|---|
| *H04B 7/0456* | (2017.01) | |
| *H04L 5/00* | (2006.01) | |
| *H04W 72/541* | (2023.01) | |

(52) U.S. Cl.
CPC ......... *H04B 7/0456* (2013.01); *H04L 5/0048* (2013.01); *H04W 72/541* (2023.01)

(58) Field of Classification Search
CPC ...... H04B 1/10; H04B 7/0626; H04B 7/0413; H04B 7/0632; H04B 7/0639; H04B 7/0452; H04B 7/0473; H04B 17/345; H04L 5/0048; H04L 5/0051; H04L 5/001; H04L 5/0053; H04L 5/0073; H04L 1/0026; H04L 5/005; H04L 5/0057; H04L 5/0023; H04L 5/10; H04L 25/03343; H04L 5/0007; H04W 8/24; H04W 72/23; H04W 24/10; H04W 72/541; H04W 72/54; H04W 72/1273; H04W 88/02; H04W 28/04; H04W 72/232; H04W 80/08
See application file for complete search history.

(56) References Cited

U.S. PATENT DOCUMENTS

| | | | | |
|---|---|---|---|---|
| 8,023,600 | B2 * | 9/2011 | Lindoff | H04L 25/0242 375/346 |
| 2008/0212666 | A1 * | 9/2008 | Kuchi | H04L 27/2647 375/231 |
| 2012/0243502 | A1 * | 9/2012 | Lindqvist | H04J 11/0046 370/330 |
| 2013/0148538 | A1 * | 6/2013 | Ohwatari | H04B 7/024 370/252 |
| 2014/0153488 | A1 * | 6/2014 | Koivisto | H04B 1/10 370/328 |
| 2014/0362769 | A1 * | 12/2014 | Chen | H04J 11/0036 370/328 |
| 2024/0022368 | A1 * | 1/2024 | Khoshnevisan | H04L 5/0048 |

* cited by examiner

*Primary Examiner* — Eva Y Puente
(74) *Attorney, Agent, or Firm* — QUALCOMM Incorporated

(57) ABSTRACT

Various aspects of the present disclosure generally relate to wireless communication. In some aspects, a user equipment (UE) may receive an indication of one or more precoding resource group (PRG) parameters associated with a network node. The UE may perform, using the one or more PRG parameters, interference rejection combining. Numerous other aspects are described.

28 Claims, 12 Drawing Sheets

INTERFERENCE REJECTION COMBINING USING PRECODING RESOURCE GROUP PARAMETER

FIELD OF THE DISCLOSURE

Aspects of the present disclosure generally relate to wireless communication and to techniques and apparatuses for interference rejection combining (IRC) using one or more precoding resource group (PRG) parameters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) may include one or more memories and one or more processors coupled to the one or more memories. The one or more processors may be configured to cause the UE to receive an indication of one or more precoding resource group (PRG) parameters associated with a network node. The one or more processors may be configured to cause the UE to perform, using the one or more PRG parameters, interference rejection combining.

In some implementations, an apparatus for wireless communication at a first network node may include one or more memories and one or more processors coupled to the one or more memories. The one or more processors may be configured to cause the first network node to receive, from a second network node, an indication of one or more PRG parameters associated with the second network node. The one or more processors may be configured to cause the first network node to transmit the indication of the one or more PRG parameters.

Some aspects described herein relate to a method of wireless communication performed by a UE. The method may include receiving an indication of one or more PRG parameters associated with a network node. The method may include performing, using the one or more PRG parameters, interference rejection combining.

Some aspects described herein relate to a method of wireless communication performed by a first network node. The method may include receiving, from a second network node, an indication of one or more PRG parameters associated with the second network node. The method may include transmitting the indication of the one or more PRG parameters.

Some aspects described herein relate to a non-transitory computer-readable medium that stores a set of instructions for wireless communication by a UE. The set of instructions, when executed by one or more processors of the UE, may cause the UE to receive an indication of one or more PRG parameters associated with a network node. The set of instructions, when executed by one or more processors of the UE, may cause the UE to perform, using the one or more PRG parameters, interference rejection combining.

Some aspects described herein relate to a non-transitory computer-readable medium that stores a set of instructions for wireless communication by a first network node. The set of instructions, when executed by one or more processors of the first network node, may cause the first network node to receive, from a second network node, an indication of one or more PRG parameters associated with the second network node. The set of instructions, when executed by one or more processors of the first network node, may cause the first network node to transmit the indication of the one or more PRG parameters.

Some aspects described herein relate to an apparatus for wireless communication. The apparatus may include means for receiving an indication of one or more PRG parameters associated with a network node. The apparatus may include means for performing, using the one or more PRG parameters, interference rejection combining.

Some aspects described herein relate to an apparatus for wireless communication. The apparatus may include means for receiving, from a network node, an indication of one or more PRG parameters associated with the network node. The apparatus may include means for transmitting the indication of the one or more PRG parameters.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
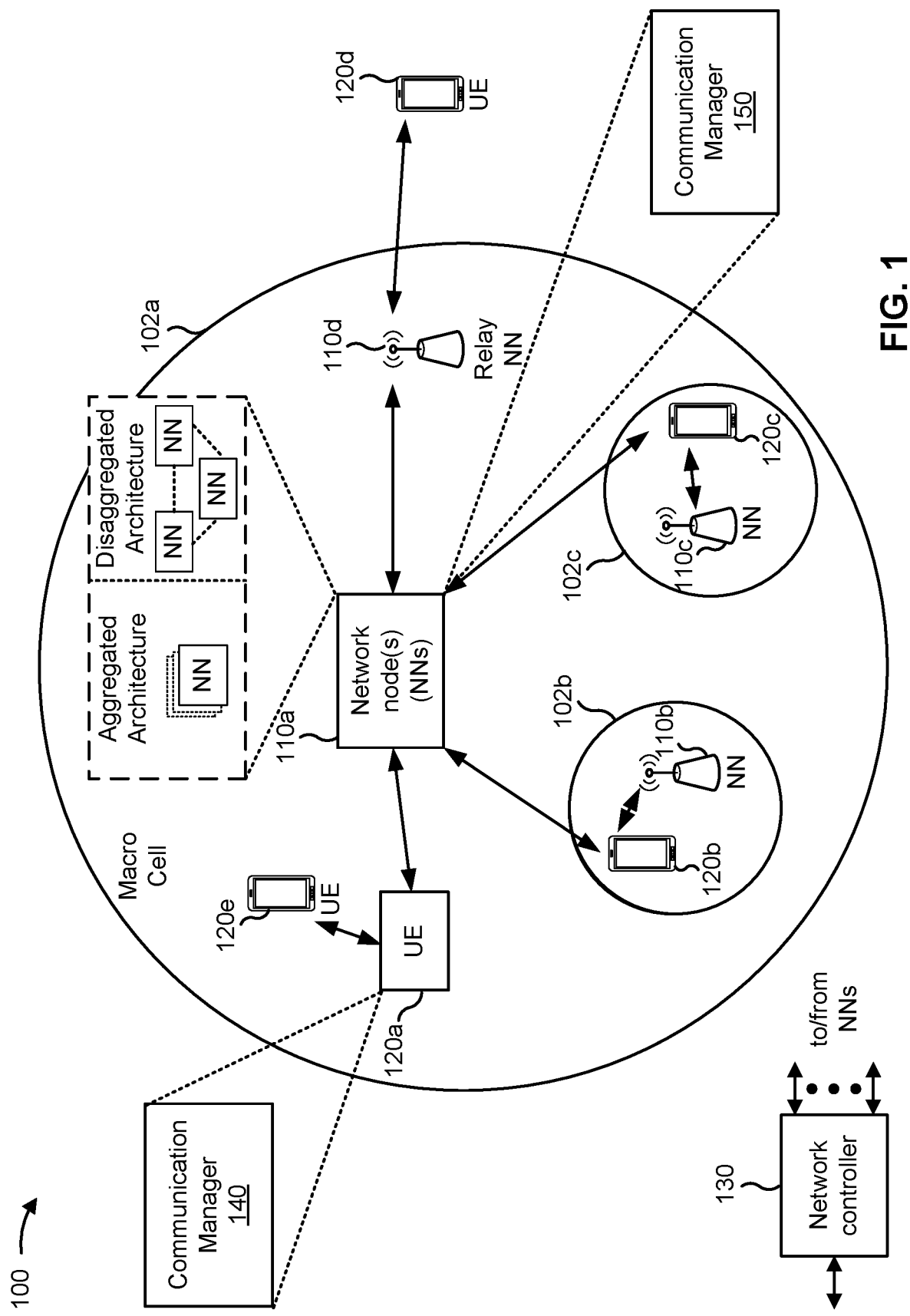
FIG. 1 is a diagram illustrating an example of a wireless network, in accordance with the present disclosure.

Interference from neighbor cells is a major limiting factor in reaching higher modulations in telecommunications (e.g., 5G communication). For example, neighbor cells might transmit on the same time slot and frequency band as the serving cell, thus intruding on the serving cell signal. To reject (e.g., cancel) interference from the neighboring cells, the served user equipment (UE) receiver can use interference rejection combining (IRC) over the received PDSCH.

As part of IRC, a UE may perform interference covariance matrix estimation across the bandwidth. However, the corresponding interferer channel—and, thus, the interference covariance matrix—can change drastically between interferer precoding resource groups (PRGs). A PRG is a constant quantity of consecutive subcarriers in a bandwidth. A PRG is a bandwidth range where a channel is constant enough to use a single precoder. As a result, the precoder (e.g., precoding) might change between different PRGs, but not within a PRG.

When performing IRC, the UE does not account for the boundaries of these changes (e.g., the boundaries of the interferer PRGs), which degrades the averaging performed by the UE to estimate the interference covariance matrix along the frequency axis. Because the UE performs IRC independent of these boundaries, the UE lacks sufficient statistical information regarding the interference to yield high performance using IRC.

Various aspects relate generally to performing IRC using one or more PRG parameters. Some aspects more specifically relate to neighbor cell PRG communication for improved IRC. In some examples, a UE may transmit, and a serving network node may receive, a PRG parameter request. The serving network node may transmit, and an interfering network node may receive, a request for one or more PRG parameters associated with the network node. The interfering network node may transmit, and the network node may receive, an indication of one or more PRG parameters associated with the network node. The one or more PRG parameters may include a PRG size and/or a PRG offset. The serving network node may transmit, and the UE may receive, an indication of the one or more PRG parameters. The UE may perform IRC using the one or more PRG parameters.

Particular aspects of the subject matter described in this disclosure can be implemented to realize one or more of the following potential advantages. In some examples, by transmitting or receiving the indication of the one or more PRG parameters, and/or performing IRC using the one or more PRG parameters, the described techniques can be used to improve the ability of the UE to apply interference rejection and thereby improve the quality of a received signal. For example, sharing PRG parameters of neighbor cell interferer(s) with a served UE may improve the interferer covariance estimation performed by the UE.

Transmitting or receiving the indication of the one or more PRG parameters based at least in part on the PRG parameter request may conserve power and/or overhead that would otherwise be consumed to transmit or receive indications of PRG parameters in the absence of the PRG parameter request. The one or more PRG parameters including the PRG size and/or offset may enable the UE to determine PRG boundaries used for improved interference rejection.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of one or more PRG parameters associated with a network node; and perform, using the one or more PRG parameters, IRC. Additionally, or alternatively, the communication manager 140 may perform one or more other operations described herein.

In some aspects, the network node 110 may include a communication manager 150. As described in more detail elsewhere herein, the communication manager 150 may receive, from a second network node, an indication of one or more PRG parameters associated with the second network node; and transmit the indication of the one or more PRG parameters. Additionally, or alternatively, the communication manager 150 may perform one or more other operations described herein.

As indicated above, FIG. 1 is provided as an example. Other examples may differ from what is described with regard to FIG. 1.

Figure 2:
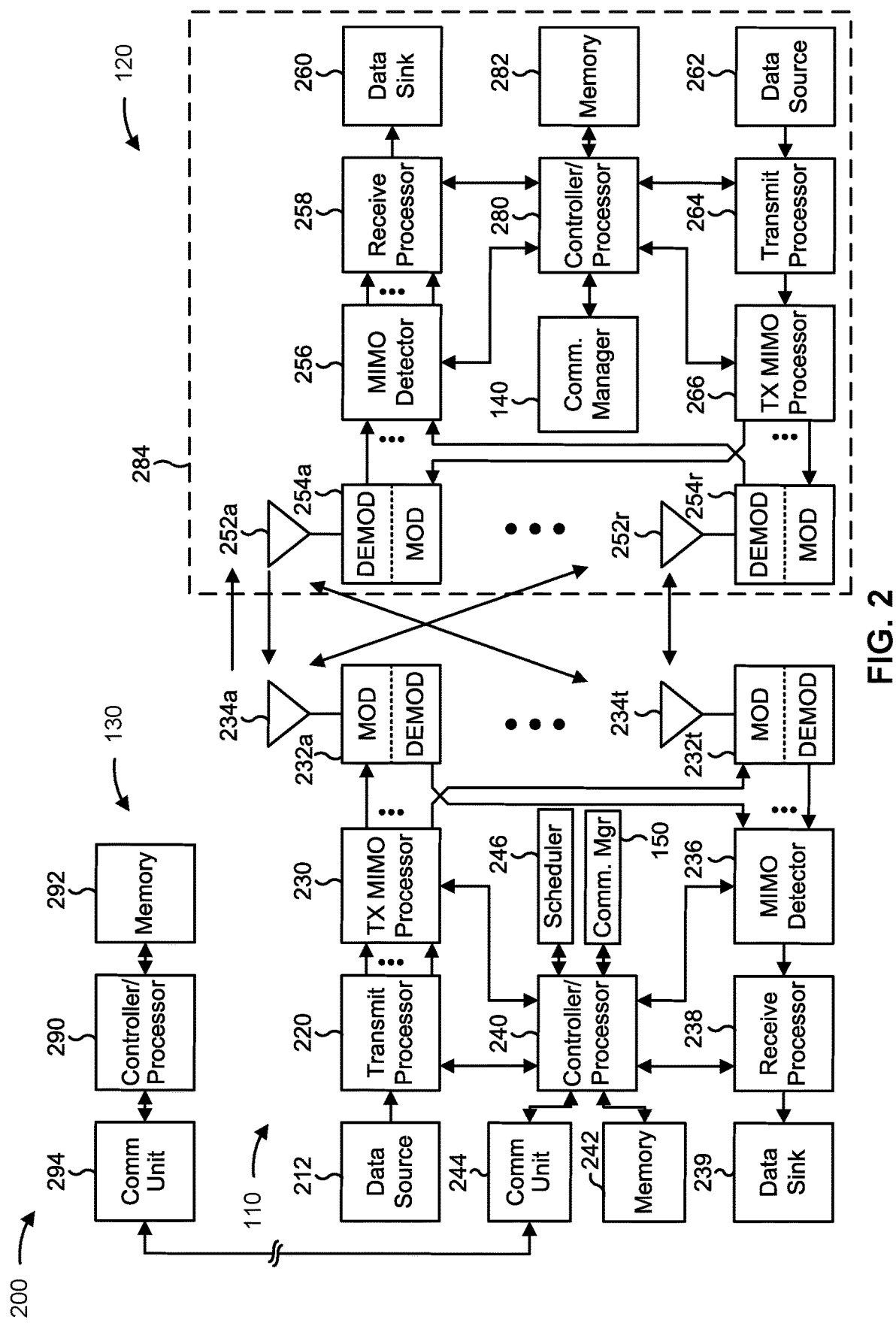
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with performing IRC using one or more PRG parameters, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving an indication of one or more PRG parameters associated with a network node; and/or means for performing, using the one or more PRG parameters, IRC. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from another network node, an indication of one or more PRG parameters associated with the other network node; and/or means for transmitting the indication of the one or more PRG parameters. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
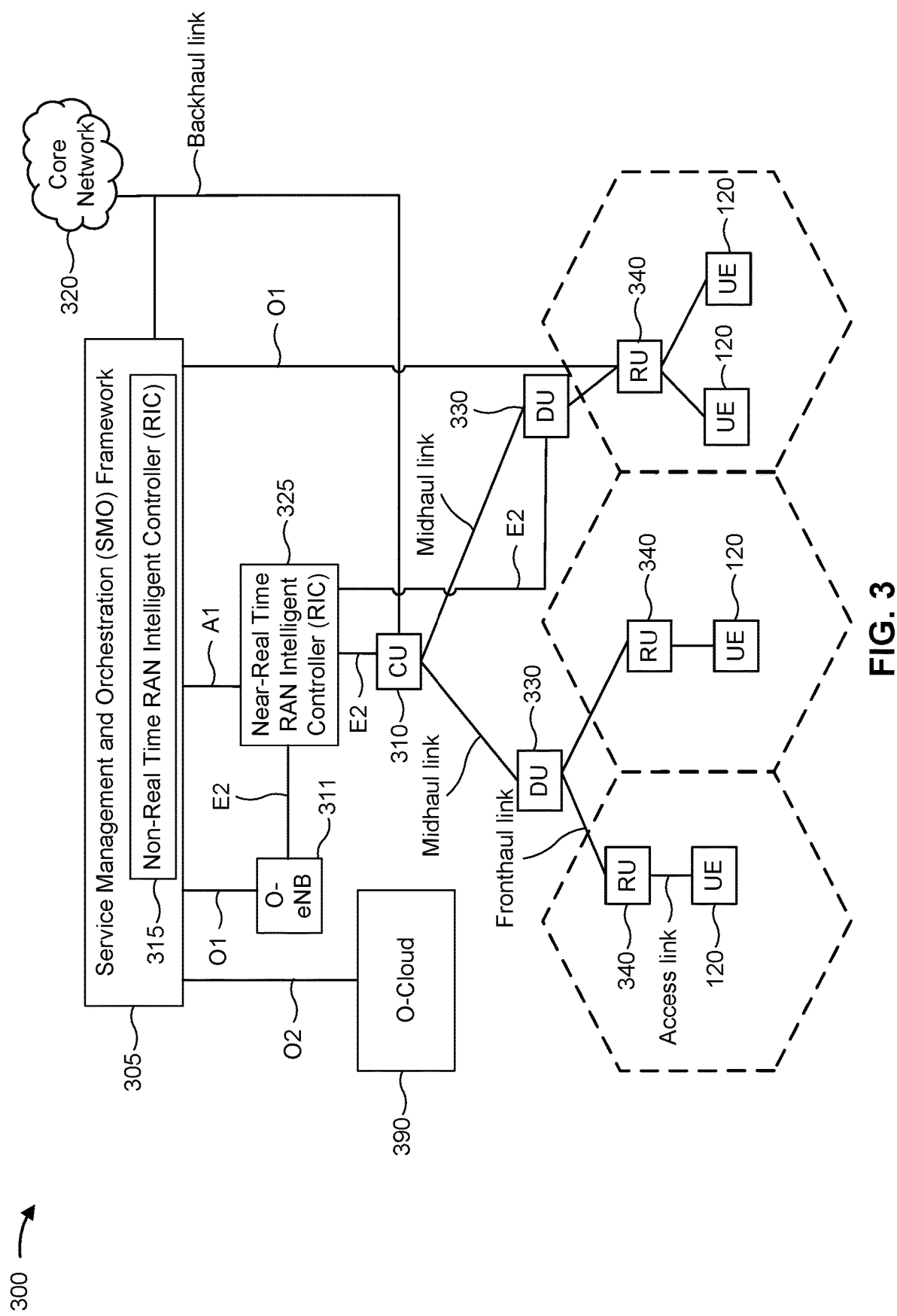
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Interference from neighbor cells is a major limiting factor in reaching higher modulations in telecommunications (e.g., 5G communication). For example, neighbor cells might transmit on the same time slot and frequency band as the serving cell, thus intruding on the serving cell signal. To reject (e.g., cancel) interference from the neighboring cells, the served UE receiver can use IRC (e.g., an IRC process or algorithm) over the received PDSCH.

As part of IRC, a UE may perform interference covariance matrix estimation across the bandwidth. However, the corresponding interferer channel—and, thus, the interference covariance matrix—can change drastically between interferer PRGs. A PRG is a constant quantity of consecutive subcarriers in a bandwidth. A PRG is a bandwidth range where a channel is constant enough to use a single precoder. As a result, the precoder (e.g., precoding) might change between different PRGs, but not within a PRG.

When performing IRC, the UE does not account for the boundaries of these changes (e.g., the boundaries of the interferer PRGs), which degrades the averaging performed by the UE to estimate the interference covariance matrix along the frequency axis. Because the UE performs IRC independent of these boundaries, the UE lacks sufficient statistical information regarding the interference to yield high performance using IRC.

For example, the interference can be described as $I(f)=H_{I,phy}(f) \cdot P_I(f) \cdot s_I(f)$, where $s_I(f)$ is the interferer-sent symbol for a specific subcarrier f, $H_{I,phy}(f)$ is the interferer physical (e.g., raw) channel, and $P_I(f)$ is the precoder. Although the channel might change slightly (e.g., depending on the delay spread of the interferer channel), the precoder does not change inside a PRG because the precoder $P_I(f)$ is chosen with a PRG size that fits the change of the physical channel. Interferer noise covariance may be $C_I(f)=E(I(f)I^H(f))=H_I(f)H_I^H(f)$, where $H_I(f)=H_{I,phy}(f) \cdot P_I(f)$. Because $C_I(f)$ is a product of $P_I(f)$ (which remains constant within a PRG) and $H_I(f)$ (which may change only slightly within a PRG), $C_I(f)$ may change only slightly within a PRG, but can change drastically between PRGs.

Figure 4:
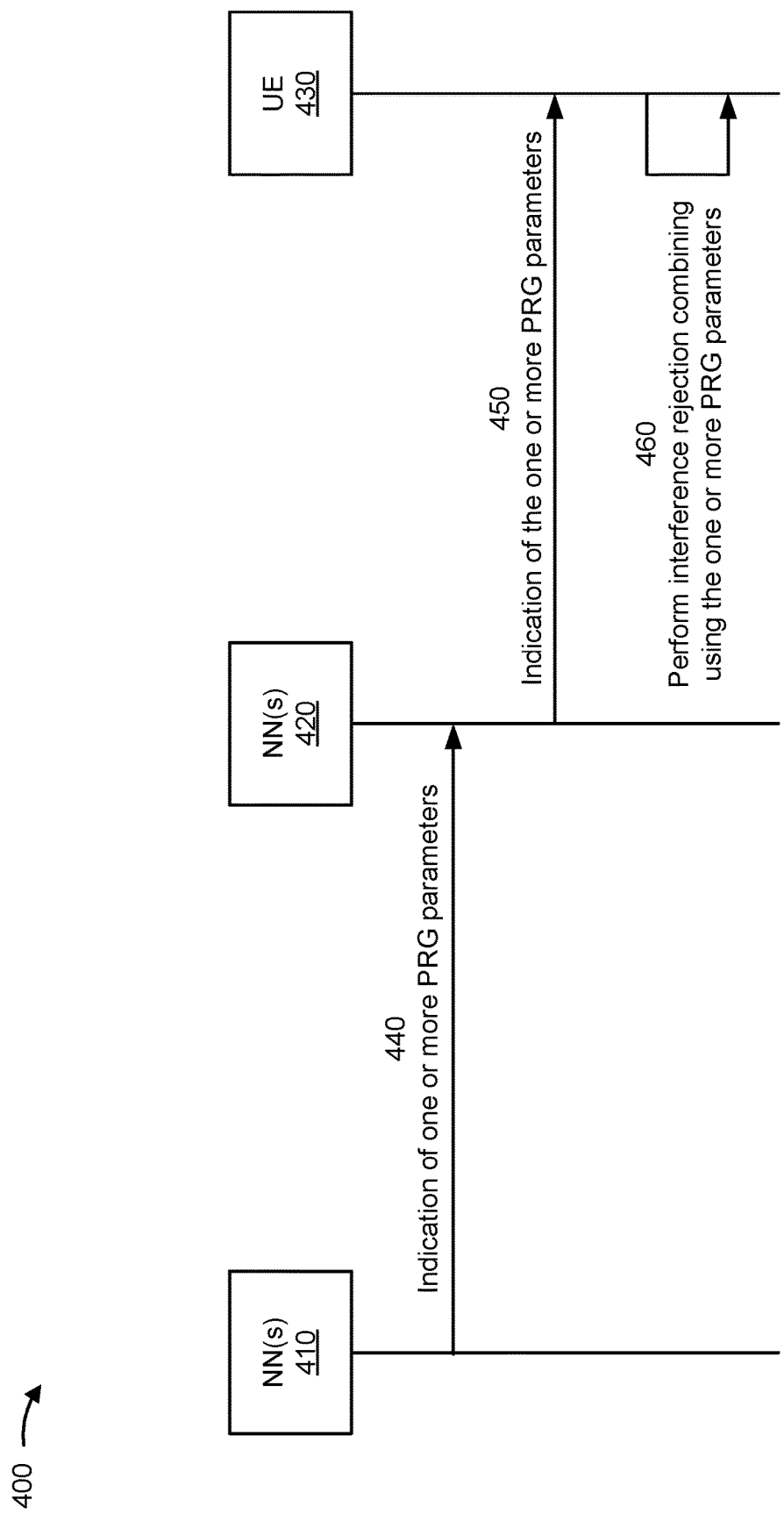
FIG. 4 is a diagram illustrating an example associated with a neighboring cell PRG communication procedure, in accordance with the present disclosure.

FIG. 4 is a diagram illustrating an example 400 associated with a neighboring cell PRG communication procedure, in accordance with the present disclosure. As shown in FIG. 4, a network node 410, a network node 420, and a UE 430 may communicate with one another. The network node 420 may be a serving network node for the UE 430, and the network node 410 may neighbor the network node 420 and interfere with transmissions received by the UE 430 from the network node 420.

In some examples, the UE 430 may determine whether an interference associated with the UE 430 satisfies an interference threshold. The interference may be associated with the UE 430 in that the UE 430 may experience the interference (e.g., due to signaling from neighboring network nodes). For example, the UE 430 may test whether the UE 430 suffers from strong downlink interference by averaging DMRS noise over the entire used bandwidth and sensing non-diagonal elements of an estimated covariance matrix.

The UE 430 may use a metric m (e.g., an upper bound on an interference-to-noise ratio) to determine whether the UE 430 is experiencing strong levels of interference. The UE 430 may estimate noise covariance $\hat{C}_I$ by averaging noise across the entire bandwidth. In the case of two neighboring interfering cells, $\hat{C}_I \approx C_n + H_2 H_2^H + H_3 H_3^H$ (up to an estimation error), where $C_n$ is diagonal (representing the RF noise matrix) and $H_2 H_2^H + H_3 H_3^H$ is the interferers noise matrix and is a non-diagonal term. As a result, the diagonal element(s) of $\hat{C}_I$ can be written as $\hat{C}_I(i, i) = \sigma_n^2 + \Sigma_{k=1}^{N_{layers2}} |H_2(i, k)|^2 + \Sigma_{k=1}^{N_{layers3}} |H_3(i, k)|^2 \equiv \sigma_n^2 + P(i)$, and the non-diagonal element(s) of $\hat{C}_I$ can be written as $\hat{C}_I(i, j) = \Sigma_{k=1}^{N_{layers2}} H_2(i, k) H_2^*(j, k) + \Sigma_{k=1}^{N_{layers3}} H_3(i, k) H_3^*(j, k)$. Notably, $|\hat{C}_I(i, j)| \leq \sqrt{P(i)P(j)} \leq \max(P(i), P(j))$.

An example metric on $\hat{C}_I$ may be a function of the inverse of the ratio between the maximal non-diagonal element absolute value and the corresponding maximal diagonal element. As a result, $$(\tilde{i}, \tilde{j}) = \underset{\substack{i=1,\ldots,N_{Rx} \\ j=(i+1),\ldots,N_{Rx}}}{\operatorname{argmax}} |\hat{C}_I(i, j)|,$$

where $(\tilde{i}, \tilde{j})$ is the maximal non-diagonal element absolute value row and column. The corresponding maximal diagonal element is:

$$\tilde{r} = \underset{(r=\tilde{i},\tilde{j})}{\operatorname{argmax}} \hat{C}_I(r, r)$$

(e.g., the maximum between $\hat{C}_I(\tilde{i}, \tilde{i})$ and $\hat{C}_I(\tilde{j}, \tilde{j})$).

For example, if $$\hat{C}_I = \begin{pmatrix} 1.02 & 0.45 & 0.55 & 0.2 \\ 0.45 & 1.07 & 0.3 & -0.65 \\ 0.55 & 0.3 & 1.05 & 0.2 \\ 0.2 & -0.65 & 0.2 & 1.03 \end{pmatrix},$$

then the ratio is $$\frac{0.65}{\max(1.07, 1.03)},$$

and the metric is $$\frac{1}{\frac{1.07}{0.65} - 1} = 1.55.$$

The inverse of the ratio is $$\frac{\hat{C}_I(\tilde{r}, \tilde{r})}{|\hat{C}_I(\tilde{i}, \tilde{j})|},$$

and based on the ratio, the metric $$m = \frac{1}{\frac{\hat{C}_I(\tilde{r}, \tilde{r})}{|\hat{C}_I(\tilde{i}, \tilde{j})|} - 1} = \frac{|\hat{C}_I(\tilde{i}, \tilde{j})|}{\hat{C}_I(\tilde{r}, \tilde{r}) - |\hat{C}_I(\tilde{i}, \tilde{j})|} \leq \frac{\max(P(\tilde{i}), P(\tilde{j}))}{\hat{C}_I(\tilde{r}, \tilde{r}) - \max(P(\tilde{i}), P(\tilde{j}))} =$$

$$\frac{\max(P(\tilde{i}), P(\tilde{j}))}{\sigma_n^2 + \max(P(\tilde{i}), P(\tilde{j})) - \max(P(\tilde{i}), P(\tilde{j}))} = \frac{\max(P(\tilde{i}), P(\tilde{j}))}{\sigma_n^2}.$$

In some aspects, the UE 430 may transmit, and the network node 420 may receive, a PRG parameter request. The PRG parameter request may be a request for information regarding one or more PRG parameters of one or more neighboring network nodes (e.g., network node 410). The UE 430 may transmit the PRG parameter request over the physical uplink shared channel (PUSCH), the physical uplink control channel (PUCCH), or the like.

In some aspects, the UE 430 may transmit, and the network node 420 may receive, the PRG parameter request based at least in part on an interference associated with the UE 430 satisfying an interference threshold. For example, if m≥M, where M is a UE-defined bound on the interference-to-noise ratio (e.g., −5 dB), then the UE 430 may determine that the interference level is sufficiently high, compared to a noise level, to trigger the neighboring cell PRG communication procedure. For example, the interference from the network node 410 may prompt the UE 430 to start the neighboring cell PRG communication procedure by transmitting the PRG parameter request.

The network node 420 may transmit, and the network node 410 may receive, a request for one or more PRG parameters associated with the network node 410. For example, the network node 420 may transmit the request for the one or more PRG parameters in response to receiving the PRG parameter request from the UE 430.

As shown by reference number 440, the network node 410 may transmit, and the network node 420 may receive, an indication of one or more PRG parameters associated with the network node 410. The one or more PRG parameters may be associated with the network node 410 in that the one or more PRG parameters may be downlink PRG parameters for downlink transmissions of the network node 410.

In some aspects, the one or more PRG parameters may include a PRG size. For example, the PRG size may be a quantity of subcarriers (or subcarrier indexes, or the like) equal to a size of a PRG. In some aspects, the one or more PRG parameters may include a PRG offset. For example, the PRG offset may be a subcarrier index that indicates where the PRG begins, ends, or the like.

The network node 410 may transmit, and the network node 420 may receive, the indication of the one or more PRG parameters based at least in part on the PRG parameter request. For example, the network node 410 may transmit the indication of the one or more PRG parameters in response to the request for the one or more PRG parameters received from the network node 420, and the network node 420 may transmit the request for the one or more PRG parameters in response to receiving the PRG parameter request from the UE 430. The network node 410 may transmit, and the network node 420 may receive, the indication of the one or more PRG parameters over the backhaul.

In some aspects, the network node 410 may transmit, and the network node 420 may receive, the indication of the one or more PRG parameters based at least in part on a periodicity associated with the indication of the one or more PRG parameters. For example, the network node 410 may transmit indications of the one or more PRG parameters periodically, and the indication associated with reference number 440 may be one such indication.

In some aspects, the network node 410 may transmit, and the network node 420 may receive, the indication of the one or more PRG parameters based at least in part on a change in the one or more PRG parameters. For example, the network node 410 may transmit, and the network node 420 may receive, the indication of the one or more PRG parameters in response to a change in a value of the PRG size and/or a change in a value of the PRG offset. For example, the network node 410 may transmit, and the network node 420 may receive, the indication of the one or more PRG parameters every time the downlink PRG size and/or offset changes.

As shown by reference number 450, the network node 420 may transmit, and the UE 430 may receive, an indication of the one or more PRG parameters. Because the PRG parameter(s) may be dynamic, the network node 420 may transmit, and the UE 430 may receive, the indication of the one or more PRG parameters via downlink control information (DCI).

As shown by reference number 460, the UE 430 may perform IRC using the one or more PRG parameters. For example, the UE 430 may determine the boundaries (e.g., borders) of one or more PRGs based on the PRG parameter(s). For example, the boundaries may be the subcarrier indexes where the PRG begins and/or ends. In some examples, the UE 430 may perform the IRC without crossing the boundaries of the PRG.

In some aspects, after transmitting the PRG parameter request, the UE 430 may determine that the interference does not satisfy the interference threshold (e.g., that the interference no longer satisfies the interference threshold). For example, the UE 430 may no longer sense strong interference from the network node 410. The UE 430 may transmit, and the network node 420 may receive, a request to cease sending indications of the one or more PRG parameters. In response to receiving the request, the network node 420 may cease transmitting the indications of the one or more PRG parameters.

In some aspects, after transmitting the indication of the one or more PRG parameters, the network node 420 may refrain from transmitting another indication of the one or more PRG parameters. For example, the network node 420 may cease transmitting the indications of the one or more PRG parameters. The network node 420 may refrain from transmitting the other indication autonomously (e.g., based on higher-level considerations of the network node 420, such as network bandwidth, power usage, or the like).

Transmitting or receiving the indication of the one or more PRG parameters, and/or performing IRC using the one or more PRG parameters, may improve the ability of the UE to apply interference rejection and thereby improve the quality of a received signal. For example, PRG boundaries associated with the PRG parameters may enable the UE to take an average within each PRG, which may yield a finer or more accurate interference estimation result (e.g., rather than averaging across the whole bandwidth, which would yield a coarser interference estimation result). Sharing PRG parameters of neighbor cell interferer(s) with a served UE may improve the interferer covariance estimation performed by the UE.

The one or more PRG parameters including the PRG size and/or offset may enable the UE to determine PRG boundaries used for improved interference rejection. Transmitting or receiving the indication of the one or more PRG parameters based at least in part on the PRG parameter request may conserve power and/or overhead that would otherwise be consumed to transmit or receive indications of PRG parameters in the absence of the PRG parameter request. Transmitting or receiving the PRG parameter request based at least in part on an interference associated with the UE satisfying an interference threshold may help to ensure that the network node refrains from transmitting indications of PRG parameters before the UE experiences sufficiently strong interference.

The UE determining that the interference does not satisfy the interference threshold may conserve power and/or overhead that would otherwise be consumed to transmit or receive indications of PRG parameters when the UE is no longer experiencing sufficiently strong interference. The UE determining that the interference does not satisfy the interference threshold may conserve power and/or overhead that would otherwise be consumed to transmit or receive indications of PRG parameters when the UE is no longer experiencing sufficiently strong interference.

The network node receiving the indication of the one or more PRG parameters based at least in part on a periodicity associated with the indication of the one or more PRG parameters may conserve power and/or overhead that would otherwise be consumed with a lower periodicity while receiving indications of the one or more PRG parameters sufficiently frequently. The network node receiving the indication of the one or more PRG parameters based at least in part on a change in the one or more PRG parameters may conserve power and/or overhead that would otherwise be consumed by the network node receiving an indication of the one or more PRG parameters when the one or more PRG parameters have not changed since the network node received a previous indication of the one or more PRG parameters.

As indicated above, FIG. 4 is provided as an example. Other examples may differ from what is described with respect to FIG. 4.

Figure 5:
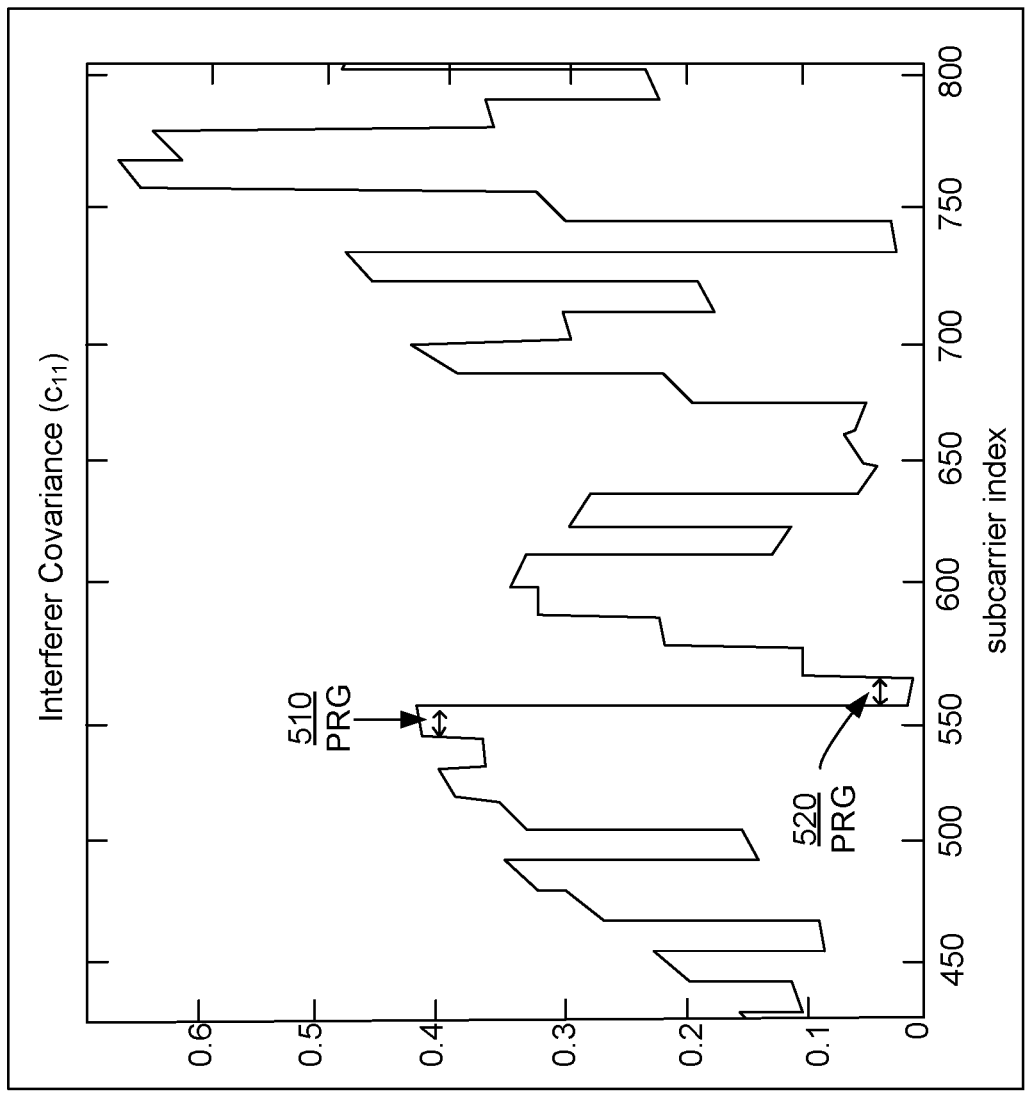
FIG. 5 is a diagram illustrating an example associated with a covariance matrix, in accordance with the present disclosure.

FIG. 5 is a diagram illustrating an example 500 associated with a covariance matrix, in accordance with the present disclosure. Example 500 depicts a $C_f(f)$ for two interferer streams and two receive antennas. In example 500, the interferer PRG size is 12 subcarriers (or 12 resource elements (REs) or 1 resource block (RB)). As shown, the interferer covariance (e.g., element (1,1)) can change dramatically between PRGs, but less so within a PRG.

In some aspects, the UE 430 (e.g., the receiver) may perform the IRC specific to a PRG associated with the one or more PRG parameters. For example, the UE 430 may receive an indication of the PRG parameter(s), determine the PRG borders of the relevant PRGs (e.g., PRG 510 and PRG 520), and perform IRC (e.g., covariance estimation) inside the PRG boundaries (e.g., inside the boundaries of PRG 510 only and inside the boundaries of PRG 520 only). To perform the IRC, the UE 430 may treat $C_I(f)$ as a constant inside a PRG (e.g., PRG 510 and/or PRG 520), and estimate the covariance as an average of the PRG subcarrier noise to obtain an estimation processing gain of approximately 10 log 10(Interferer_PRG_size)=10 log 10(12) (e.g., approximately 11 dB).

As indicated above, FIG. 5 is provided as an example. Other examples may differ from what is described with respect to FIG. 5.

Figure 6:
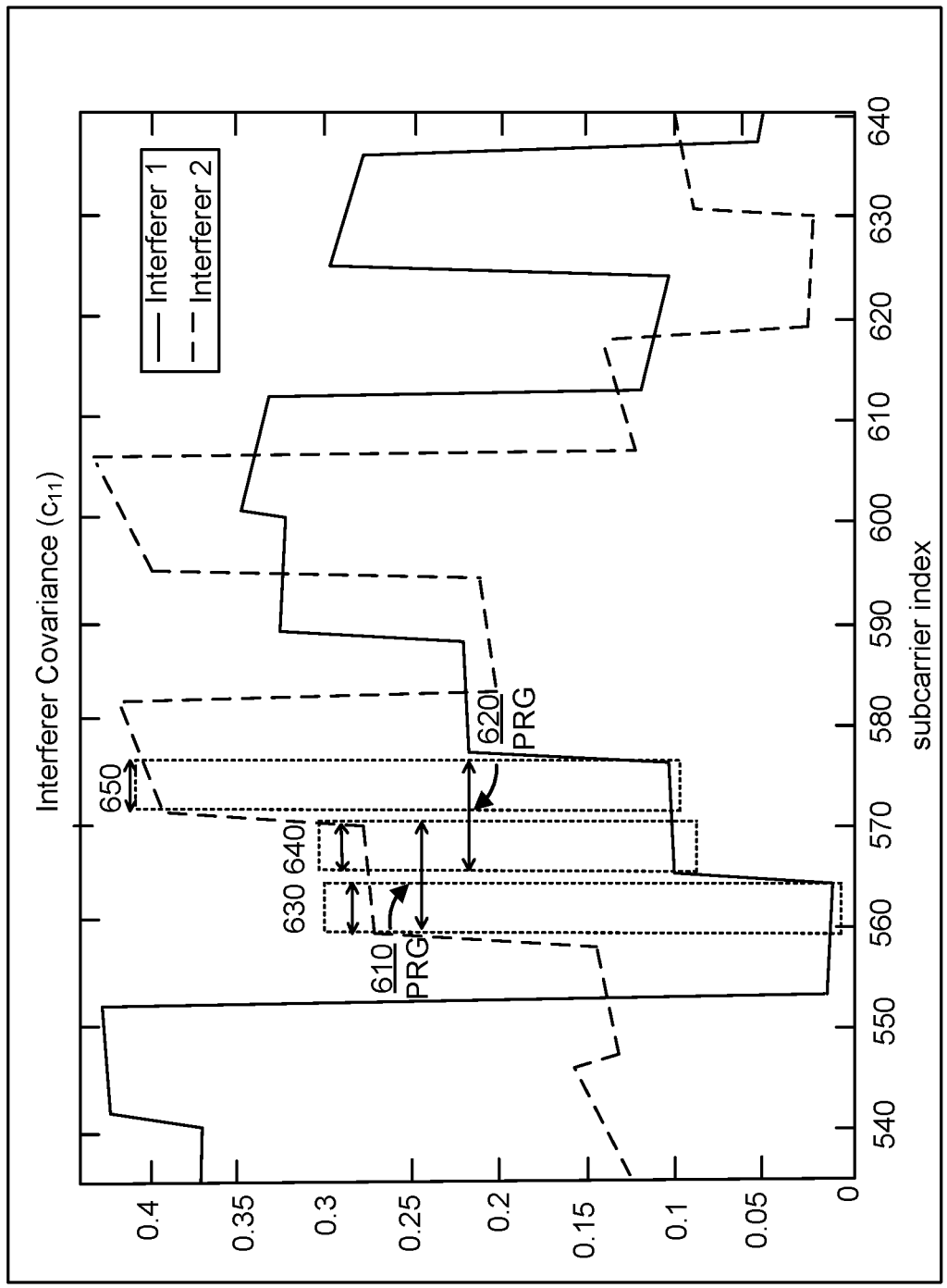
FIG. 6 is a diagram illustrating an example associated with two covariance matrices, in accordance with the present disclosure.

FIG. 6 is a diagram illustrating an example 600 associated with two covariance matrices, in accordance with the present disclosure. Example 600 extends example 500 to multiple interferers. In example 600, both interferer PRG sizes are 12 REs, but one interferer is offset by 6 REs relative to the other interferer.

In some aspects, the UE 430 may receive one or more first PRG parameters (e.g., a first PRG size and/or a first PRG offset) and one or more second PRG parameters (e.g., a second PRG size and/or a second PRG offset). For example, the first and second PRG sizes may be 12 REs, and the first and second PRG offsets may be offset by 6 REs.

The UE 430 may perform the IRC specific to a bandwidth range containing at least a portion of a PRG (e.g., PRG 610) associated with the one or more first PRG parameters and at least a portion of a PRG (e.g., PRG 620) associated with the one or more second PRG parameters. For example, the UE 430 may perform IRC (e.g., covariance estimation) inside each of the bandwidth ranges 630-650 (e.g., inside the bandwidth range 630 only, inside the bandwidth range 640 only, and inside the bandwidth range 650 only).

For example, because multiple (strong) interferers exist, the UE 430 may estimate the combined covariance $C_I(f) = C_{I,1}(f) + C_{I,2}(f)$ and identify two borders in which both the interferer covariance matrices $C_{I,1}(f)$, and $C_{I,2}(f)$ are constant (allowing for small channel variation). Because the interferer covariance matrices are both (approximately) constant on every 6 consecutive REs with well-defined boundaries (e.g., edges) of the start and end of each group (e.g., section) of 6 consecutive REs, each estimation performed by the UE 430 may correspond to a group of 6 consecutive REs. The UE 430 may estimate the combined interferers noise covariance by noise averaging to obtain an estimation processing gain of approximately 10 log 10(6) (e.g., approximately 8 dB).

As indicated above, FIG. 6 is provided as an example. Other examples may differ from what is described with respect to FIG. 6.

Figure 7:
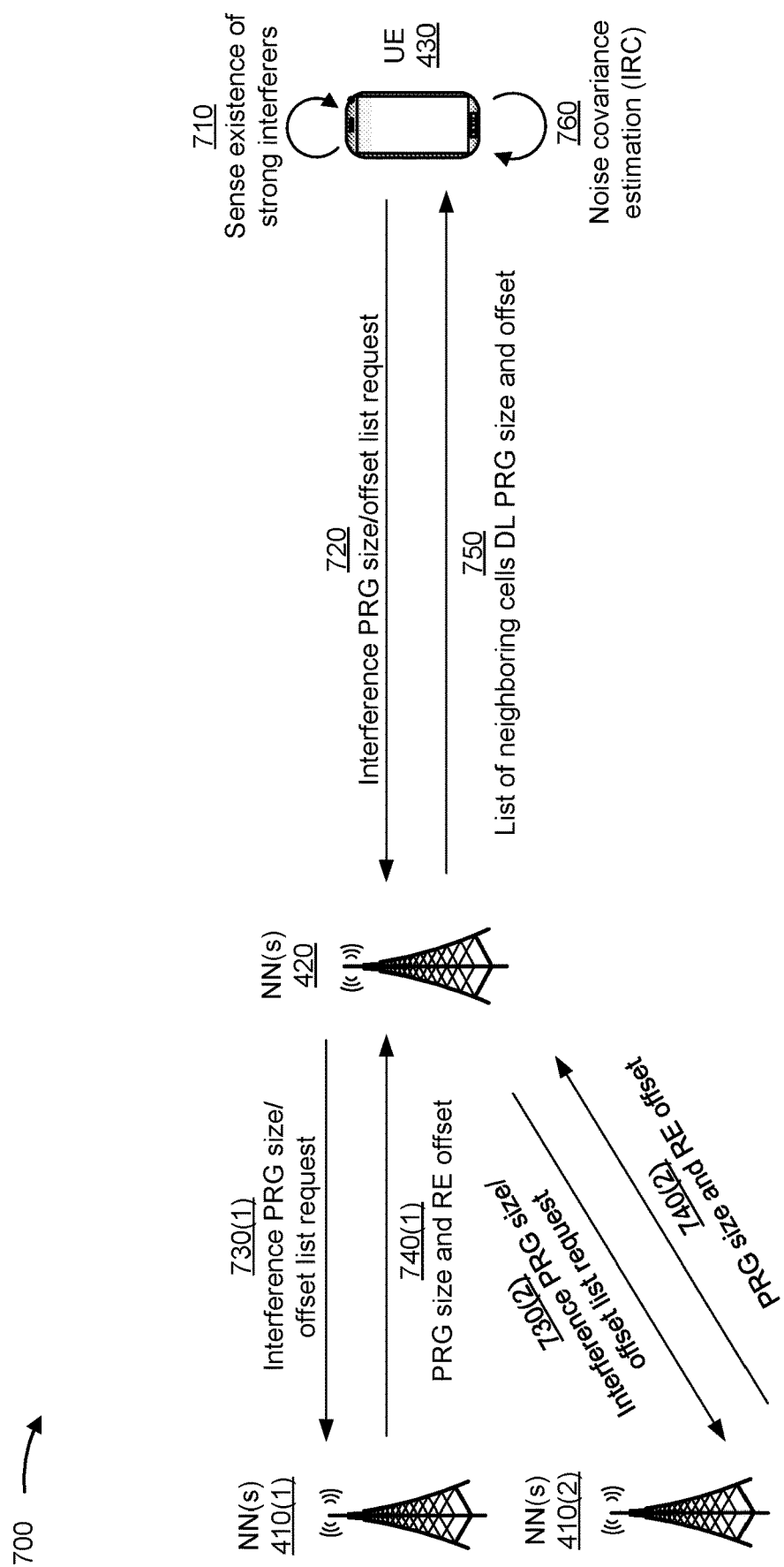
FIG. 7 is a diagram illustrating an example associated with signaling for interference rejection combining using precoding resource group parameters, in accordance with the present disclosure.

FIG. 7 is a diagram illustrating an example 700 associated with signaling for IRC using PRG parameters, in accordance with the present disclosure.

As shown by reference number 710, the UE 430 may determine that an interference associated with the UE satisfies an interference threshold. For example, the UE 430 may sense the existence of strong interferers. The UE 430 may determine that the UE 430 has received strong interference. Thus, the UE 430 may determine to initiate neighboring cell PRG communication.

As shown by reference number 720, the UE 430 may transmit, and the network node 420 (e.g., a serving gNB) may receive, a PRG parameter request. For example, the PRG parameter request may include a request for a list of interference PRG sizes and/or offsets. For example, the UE 430 may message the network node 420 with a request for information regarding the interferers PRG size and offset (e.g., over PUSCH, PUCCH, or the like).

As shown by reference numbers 730(1) and 730(2), the network node 420 may transmit, and the network nodes 410(1) and 420(2) (e.g., interfering gNBs) may receive, the PRG parameter request. For example, the network node 420 may sends messages over the backhaul (e.g., using X2 protocol) to neighboring cells requesting downlink allocation of the network nodes 410(1) and 410(2) for PRG size and offset.

As shown by reference number 740(1), the network node 410(1) may transmit, and the network node 420 may receive, an indication of one or more PRG parameters associated with the network node 410(1). For example, the one or more PRG parameters may include a PRG size and an RE offset for the network node 410(1). As shown by reference number 740(2), the network node 410(2) may transmit, and the network node 420 may receive, an indication of one or more PRG parameters associated with the network node 410(2). For example, the one or more PRG parameters may include a PRG size and an RE offset for the network node 410(2).

The network nodes 410(1) and 410(2) may respond (e.g., over the backhaul) by sending respective downlink PRG sizes and/or offsets. In some examples, the network node 420 may receive the indication(s) of the one or more PRG parameters based at least in part on a periodicity associated with the indication of the one or more PRG parameters. For example, the network nodes 410(1) and 410(2) may respond periodically. In some examples, the network node 420 may receive the indication(s) of the one or more PRG parameters based at least in part on a change in the one or more PRG parameters. For example, the network node 410(2) may respond every time the downlink PRG size and/or offset changes.

As shown by reference number 750, the network node 420 may transmit, and the UE 430 may receive, the indication(s) of the one or more PRG parameters. For example, the indication(s) of the one or more PRG parameters may include a list of downlink PRG sizes and offsets for the network nodes 410(1) and 410(2) (e.g., for neighboring cells). For example, the network node 420 may send, to the UE 430, PDSCH data coupled with a message (over the physical downlink control channel (PDCCH)) containing the current list of pairs of {PRG size, PRG offset}, each pair corresponding to network node 410(1) or network node 410(2).

As shown by reference number 760, the UE 430 may perform, using the one or more PRG parameters, IRC. For example, the UE 430 may perform noise covariance estimation based at least in part on the PRG parameter(s). For example, the UE 430 may use the list to identify the edges of each noise estimation region, thus improving interferer covariance estimation and interference rejection capabilities.

The network node 420 may continue to transmit, and the UE 430 may continue to receive, indications of the one or more PRG parameters until the network node 420 and/or the UE 430 determine to cease transmission and/or reception of the indications. In some examples, the network node 420 may continue to transmit, and the UE 430 may continue to receive, the indications until the UE 430 determines that the interference no longer satisfies the interference threshold. For example, the UE may request to cease transmission and/or reception of the indications based on the UE 430 no longer sensing strong interferers. In some examples, the network node 420 may determine to refrain from transmitting further indications of the one or more PRG parameters. For example, the network node 420 may determine to cease transmission and/or reception of the indications based at least in part on higher-level considerations of the network node 420.

As indicated above, FIG. 7 is provided as an example. Other examples may differ from what is described with respect to FIG. 7.

Figure 8:
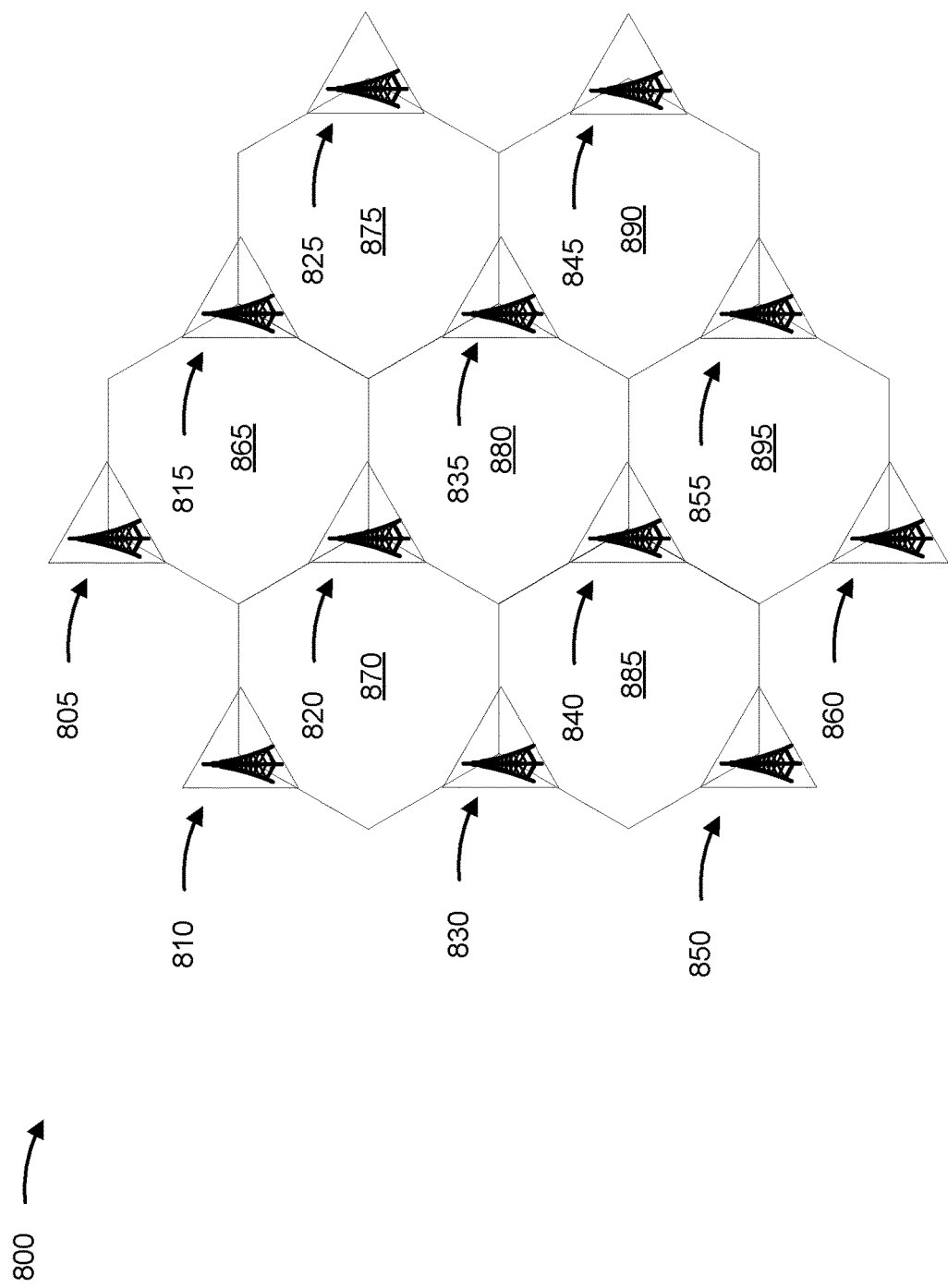
FIG. 8 is a diagram illustrating an example associated with identification of interfering network nodes, in accordance with the present disclosure.

FIG. 8 is a diagram illustrating an example 800 associated with identification of interfering network nodes, in accordance with the present disclosure.

Example 800 includes network nodes 805-860 which form sectors (e.g., areas) 865-895. A given network node may have two possible interfering network nodes for each sector. As a result, a UE in a given sector may experience interference from up to two interfering network nodes. Thus, the interfering network nodes may be identified based on the sector in which the UE is located.

As shown, for example, network node 820 can serve three sectors: sector 865, 870, and 880. A UE located in sector 880 that is being served by network node 820 may experience interference from network node 835 and/or network node 840. Thus, the interfering network nodes (e.g., network node 835 and/or network node 840) may be identified based on the UE being located in sector 880.

As indicated above, FIG. 8 is provided as an example. Other examples may differ from what is described with respect to FIG. 8.

Figure 9:
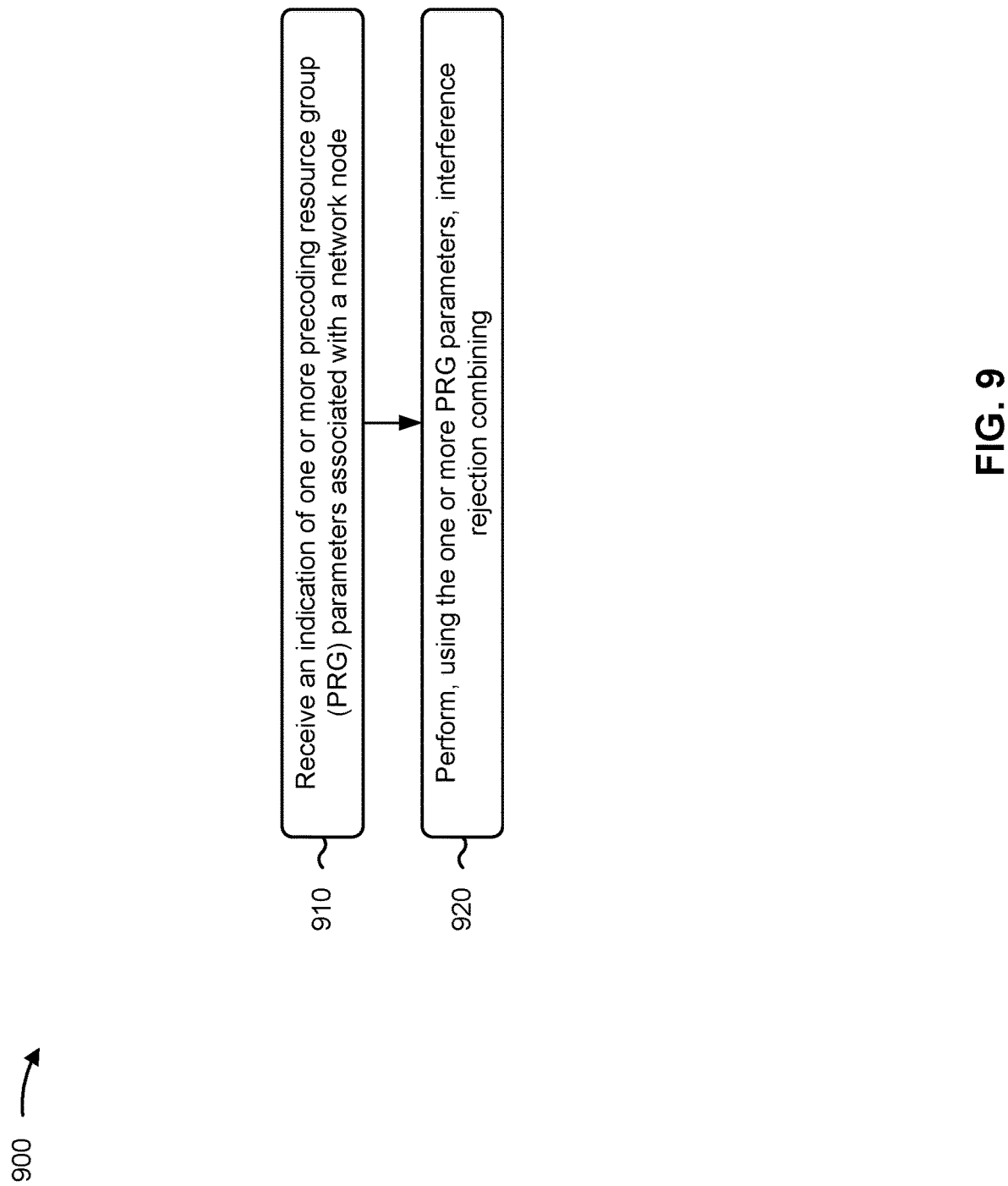
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with IRC using one or more PRG parameters.

As shown in FIG. 9, in some aspects, process 900 may include receiving an indication of one or more PRG parameters associated with a network node (block 910). For example, the UE (e.g., using reception component 1102 and/or communication manager 1106, depicted in FIG. 11) may receive an indication of one or more PRG parameters associated with a network node, as described above.

As further shown in FIG. 9, in some aspects, process 900 may include performing, using the one or more PRG parameters, IRC (block 920). For example, the UE (e.g., using communication manager 1106, depicted in FIG. 11) may perform, using the one or more PRG parameters, IRC, as described above.

Process 900 may include additional aspects, such as any single aspect or any combination of aspects described below and/or in connection with one or more other processes described elsewhere herein.

In a first aspect, performing the IRC includes performing the IRC specific to a PRG associated with the one or more PRG parameters.

In a second aspect, alone or in combination with the first aspect, the one or more PRG parameters are one or more first PRG parameters, the network node is a first network node, process 900 includes receiving an indication of one or more second PRG parameters associated with a second network node, and performing the IRC includes performing the IRC specific to a bandwidth range containing at least a portion of a PRG associated with the one or more first PRG parameters and at least a portion of a PRG associated with the one or more second PRG parameters.

In a third aspect, alone or in combination with one or more of the first and second aspects, process 900 includes transmitting a PRG parameter request, and receiving the indication of the one or more PRG parameters includes receiving the indication of the one or more PRG parameters based at least in part on the PRG parameter request.

In a fourth aspect, alone or in combination with one or more of the first through third aspects, process 900 includes transmitting the PRG parameter request based at least in part on an interference associated with the UE satisfying an interference threshold.

In a fifth aspect, alone or in combination with one or more of the first through fourth aspects, process 900 includes determining, after transmitting the PRG parameter request, that the interference does not satisfy the interference threshold.

In a sixth aspect, alone or in combination with one or more of the first through fifth aspects, the one or more PRG parameters include a PRG size.

In a seventh aspect, alone or in combination with one or more of the first through sixth aspects, the one or more PRG parameters include a PRG offset.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
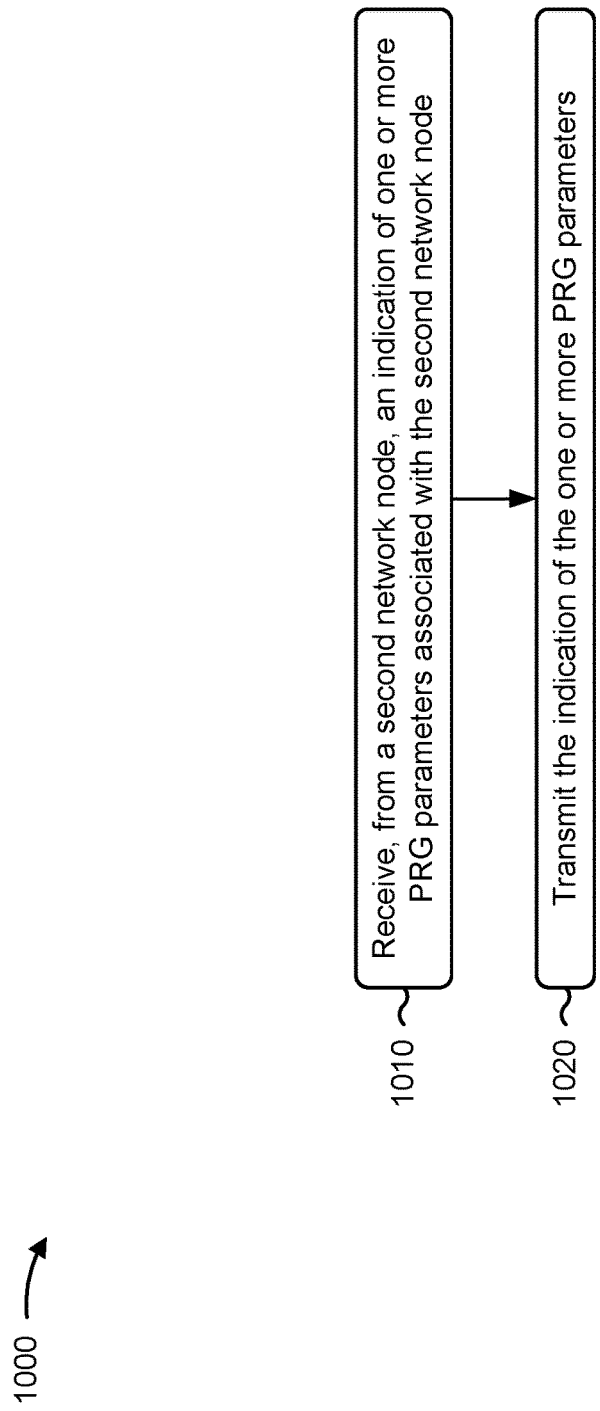
FIG. 10 is a diagram illustrating an example process performed, for example, at a first network node or an apparatus of a first network node, in accordance with the present disclosure.

FIG. 10 is a diagram illustrating an example process 1000 performed, for example, at a first network node or an apparatus of a first network node, in accordance with the present disclosure. Example process 1000 is an example where the apparatus or the first network node (e.g., network node 110) performs operations associated with IRC using one or more PRG parameters.

As shown in FIG. 10, in some aspects, process 1000 may include receiving, from a second network node, an indication of one or more PRG parameters associated with the second network node (block 1010). For example, the first network node (e.g., using reception component 1202 and/or communication manager 1206, depicted in FIG. 12) may receive, from a second network node, an indication of one or more PRG parameters associated with the second network node, as described above.

As further shown in FIG. 10, in some aspects, process 1000 may include transmitting the indication of the one or more PRG parameters (block 1020). For example, the first network node (e.g., using transmission component 1204 and/or communication manager 1206, depicted in FIG. 12) may transmit the indication of the one or more PRG parameters, as described above.

Process 1000 may include additional aspects, such as any single aspect or any combination of aspects described below and/or in connection with one or more other processes described elsewhere herein.

In a first aspect, the one or more PRG parameters are one or more first PRG parameters, and process 1000 includes transmitting an indication of one or more second PRG parameters associated with a third network node.

In a second aspect, alone or in combination with the first aspect, process 1000 includes receiving a PRG parameter request, and transmitting the indication of the one or more PRG parameters includes transmitting the indication of the one or more PRG parameters based at least in part on the PRG parameter request.

In a third aspect, alone or in combination with one or more of the first and second aspects, process 1000 includes receiving the PRG parameter request based at least in part on an interference associated with a UE satisfying an interference threshold.

In a fourth aspect, alone or in combination with one or more of the first through third aspects, process 1000 includes refraining, after transmitting the indication of the one or more PRG parameters, from transmitting another indication of the one or more PRG parameters.

In a fifth aspect, alone or in combination with one or more of the first through fourth aspects, the one or more PRG parameters include one or more of a PRG size or a PRG offset.

In a sixth aspect, alone or in combination with one or more of the first through fifth aspects, receiving the indication of the one or more PRG parameters includes receiving the indication of the one or more PRG parameters based at least in part on a periodicity associated with the indication of the one or more PRG parameters.

In a seventh aspect, alone or in combination with one or more of the first through sixth aspects, receiving the indication of the one or more PRG parameters includes receiving the indication of the one or more PRG parameters based at least in part on a change in the one or more PRG parameters.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
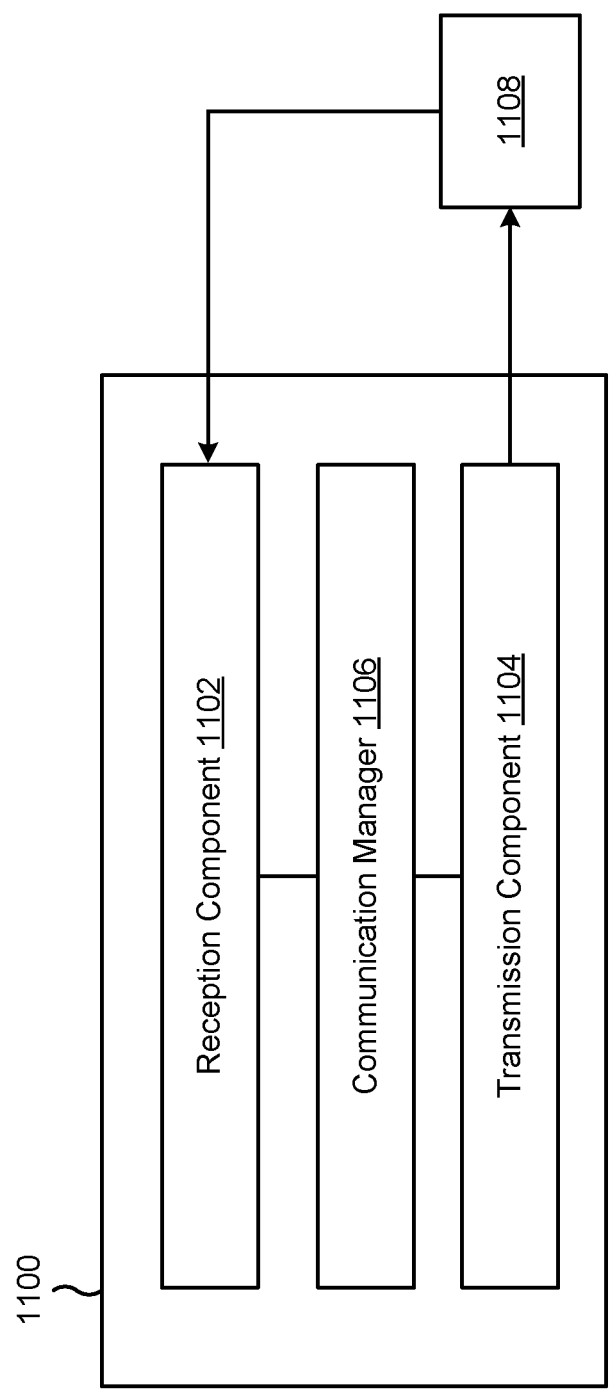
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive an indication of one or more PRG parameters associated with a network node, and the communication manager 1106 may perform, using the one or more PRG parameters, IRC. The transmission component 1104 may transmit a PRG parameter request. The communication manager 1106 may determine, after transmitting the PRG parameter request, that the interference does not satisfy the interference threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
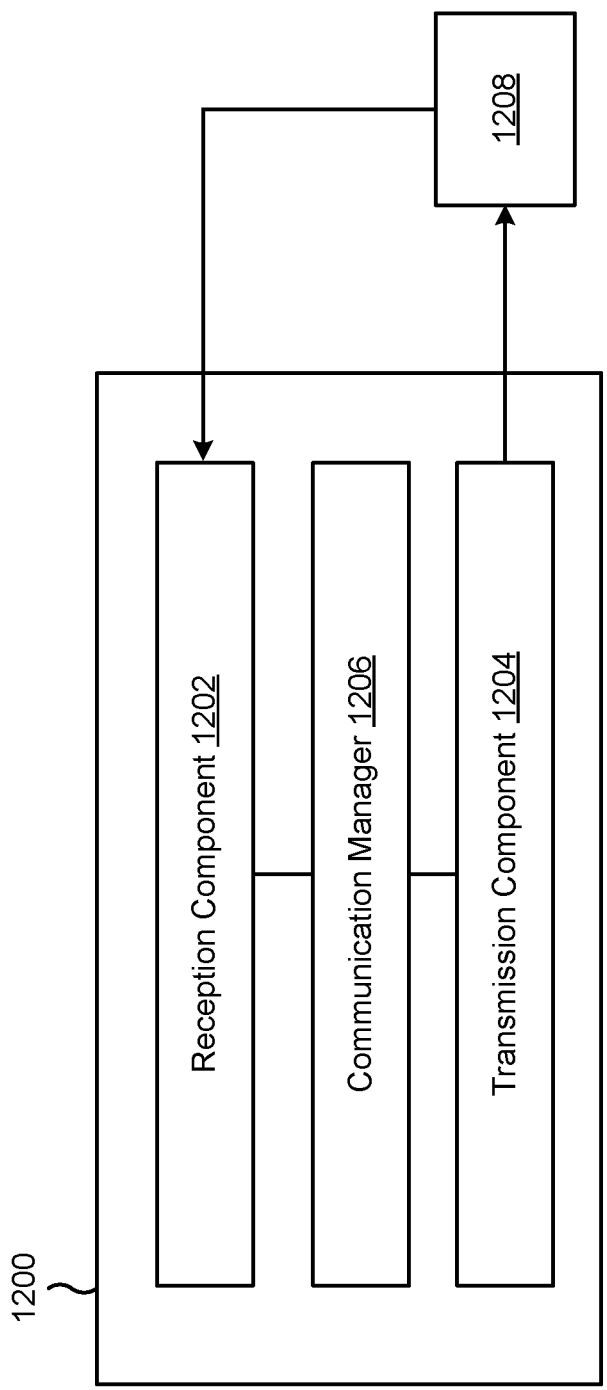
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a first network node, or a first network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the first network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the first network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the first network node described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from a second network node, an indication of one or more PRG parameters associated with the second network node. The transmission component 1204 may transmit the indication of the one or more PRG parameters. The reception component 1202 may receive a PRG parameter request. The communication manager 1206 may refrain, after transmitting the indication of the one or more PRG parameters, from transmitting another indication of the one or more PRG parameters.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving an indication of one or more PRG parameters associated with a network node; and performing, using the one or more PRG parameters, IRC.

Aspect 2: The method of Aspect 1, wherein performing the IRC includes performing the IRC specific to a PRG associated with the one or more PRG parameters.

Aspect 3: The method of any of Aspects 1-2, wherein the one or more PRG parameters are one or more first PRG parameters, and wherein the network node is a first network node, the method further comprising: receiving an indication of one or more second PRG parameters associated with a second network node, wherein performing the IRC includes performing the IRC specific to a bandwidth range containing at least a portion of a PRG associated with the one or more first PRG parameters and at least a portion of a PRG associated with the one or more second PRG parameters.

Aspect 4: The method of any of Aspects 1-3, further comprising: transmitting a PRG parameter request, wherein receiving the indication of the one or more PRG parameters includes receiving the indication of the one or more PRG parameters based at least in part on the PRG parameter request.

Aspect 5: The method of Aspect 4, wherein transmitting the PRG parameter request includes transmitting the PRG parameter request based at least in part on an interference associated with the UE satisfying an interference threshold.

Aspect 6: The method of Aspect 5, further comprising: determining, after transmitting the PRG parameter request, that the interference does not satisfy the interference threshold.

Aspect 7: The method of any of Aspects 1-6, wherein the one or more PRG parameters include a PRG size.

Aspect 8: The method of any of Aspects 1-7, wherein the one or more PRG parameters include a PRG offset.

Aspect 9: A method of wireless communication performed by a first network node, comprising: receiving, from a second network node, an indication of one or more PRG parameters associated with the second network node; and transmitting the indication of the one or more PRG parameters.

Aspect 10: The method of Aspect 9, wherein the one or more PRG parameters are one or more first PRG parameters, the method further comprising: transmitting an indication of one or more second PRG parameters associated with a third network node.

Aspect 11: The method of any of Aspects 9-10, further comprising: receiving a PRG parameter request, wherein transmitting the indication of the one or more PRG parameters includes transmitting the indication of the one or more PRG parameters based at least in part on the PRG parameter request.

Aspect 12: The method of Aspect 11, wherein receiving the PRG parameter request includes receiving the PRG parameter request based at least in part on an interference associated with a UE satisfying an interference threshold.

Aspect 13: The method of any of Aspects 9-12, further comprising: refraining, after transmitting the indication of the one or more PRG parameters, from transmitting another indication of the one or more PRG parameters.

Aspect 14: The method of any of Aspects 9-13, wherein the one or more PRG parameters include one or more of a PRG size or a PRG offset.

Aspect 15: The method of any of Aspects 9-14, wherein receiving the indication of the one or more PRG parameters includes receiving the indication of the one or more PRG parameters based at least in part on a periodicity associated with the indication of the one or more PRG parameters.

Aspect 16: The method of any of Aspects 9-15, wherein receiving the indication of the one or more PRG parameters includes receiving the indication of the one or more PRG parameters based at least in part on a change in the one or more PRG parameters.

Aspect 17: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-16.

Aspect 18: An apparatus for wireless communication at a device, the apparatus comprising one or more memories and one or more processors coupled to the one or more memories, the one or more processors configured to cause the device to perform the method of one or more of Aspects 1-16.

Aspect 19: An apparatus for wireless communication, the apparatus comprising at least one means for performing the method of one or more of Aspects 1-16.

Aspect 20: A non-transitory computer-readable medium storing code for wireless communication, the code comprising instructions executable by one or more processors to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

Aspect 22: A device for wireless communication, the device comprising a processing system that includes one or more processors and one or more memories coupled with the one or more processors, the processing system configured to cause the device to perform the method of one or more of Aspects 1-16.

Aspect 23: An apparatus for wireless communication at a device, the apparatus comprising one or more memories and one or more processors coupled to the one or more memories, the one or more processors individually or collectively configured to cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to cause the UE to:
      receive an indication of one or more precoding resource group (PRG) parameters associated with a network node; and
      perform, using the one or more PRG parameters, interference rejection combining specific to a PRG associated with the one or more PRG parameters.

2. The apparatus of claim 1, wherein the one or more PRG parameters are one or more first PRG parameters, wherein the network node is a first network node, and wherein the one or more processors are further configured to cause the UE to:
   receive an indication of one or more second PRG parameters associated with a second network node,
      wherein the one or more processors, to cause the UE to perform the interference rejection combining, are configured to cause the UE to perform the interference rejection combining specific to a bandwidth range containing at least a portion of the PRG associated with the one or more first PRG parameters and at least a portion of a PRG associated with the one or more second PRG parameters.

3. The apparatus of claim 1, wherein the one or more processors are further configured to cause the UE to:
   transmit a PRG parameter request,
      wherein the one or more processors, to cause the UE to receive the indication of the one or more PRG parameters, are configured to cause the UE to receive the indication of the one or more PRG parameters based at least in part on the PRG parameter request.

4. The apparatus of claim 3, wherein the one or more processors, to cause the UE to transmit the PRG parameter request, are configured to cause the UE to transmit the PRG parameter request based at least in part on an interference associated with the UE satisfying an interference threshold.

5. The apparatus of claim 4, wherein the one or more processors are further configured to cause the UE to:
   determine, after transmitting the PRG parameter request, that the interference does not satisfy the interference threshold.

6. The apparatus of claim 1, wherein the one or more PRG parameters include a PRG size.

7. The apparatus of claim 1, wherein the one or more PRG parameters include a PRG offset.

8. An apparatus for wireless communication at a first network node, comprising:
   one or more memories; and
   one or more processors, coupled to the one or more memories, configured to cause the first network node to:
      receive, from a second network node, an indication of one or more precoding resource group (PRG) parameters of a PRG associated with the second network node, wherein the PRG comprises a bandwidth range associated with a precoder, and wherein the one or more PRG parameters comprise a PRG size and a PRG offset; and
      transmit the indication of the one or more PRG parameters.

9. The apparatus of claim 8, wherein the one or more processors are further configured to cause the first network node to:
   transmit an indication of one or more second PRG parameters associated with a third network node.

10. The apparatus of claim 8, wherein the one or more processors are further configured to cause the first network node to:
    receive a PRG parameter request,
       wherein the one or more processors, to cause the first network node to transmit the indication of the one or more PRG parameters, are configured to cause the first network node to transmit the indication of the one or more PRG parameters based at least in part on the PRG parameter request.

11. The apparatus of claim 10, wherein the one or more processors, to cause the first network node to receive the PRG parameter request, are configured to cause the first network node to receive the PRG parameter request based at least in part on an interference associated with a user equipment (UE) satisfying an interference threshold.

12. The apparatus of claim 8, wherein the one or more processors are further configured to cause the first network node to:

refrain, after transmitting the indication of the one or more PRG parameters, from transmitting another indication of the one or more PRG parameters.

13. The apparatus of claim 8, wherein the one or more processors, to cause the first network node to receive the indication of the one or more PRG parameters, are configured to cause the first network node to receive the indication of the one or more PRG parameters based at least in part on a periodicity associated with the indication of the one or more PRG parameters.

14. The apparatus of claim 8, wherein the one or more processors, to cause the first network node to receive the indication of the one or more PRG parameters, are configured to cause the first network node to receive the indication of the one or more PRG parameters based at least in part on a change in the one or more PRG parameters.

15. A method of wireless communication performed by a user equipment (UE), comprising:
   receiving an indication of one or more precoding resource group (PRG) parameters associated with a network node; and
   performing, using the one or more PRG parameters, interference rejection combining specific to a PRG associated with the one or more PRG parameters.

16. The method of claim 15, wherein the one or more PRG parameters are one or more first PRG parameters, and wherein the network node is a first network node, the method further comprising:
   receiving an indication of one or more second PRG parameters associated with a second network node,
      wherein performing the interference rejection combining includes performing the interference rejection combining specific to a bandwidth range containing at least a portion of the PRG associated with the one or more first PRG parameters and at least a portion of a PRG associated with the one or more second PRG parameters.

17. The method of claim 15, further comprising:
   transmitting a PRG parameter request,
      wherein receiving the indication of the one or more PRG parameters includes receiving the indication of the one or more PRG parameters based at least in part on the PRG parameter request.

18. The method of claim 17, wherein transmitting the PRG parameter request includes transmitting the PRG parameter request based at least in part on an interference associated with the UE satisfying an interference threshold.

19. The method of claim 18, further comprising:
   determining, after transmitting the PRG parameter request, that the interference does not satisfy the interference threshold.

20. The method of claim 15, wherein the one or more PRG parameters include a PRG size.

21. The method of claim 15, wherein the one or more PRG parameters include a PRG offset.

22. A method of wireless communication performed by a first network node, comprising:
   receiving, from a second network node, an indication of one or more precoding resource group (PRG) parameters associated with a PRG of the second network node, wherein the PRG comprises a bandwidth range associated with a precoder, and wherein the one or more PRG parameters comprise a PRG size and a PRG offset; and
   transmitting the indication of the one or more PRG parameters.

23. The method of claim 22, wherein the one or more PRG parameters are one or more first PRG parameters, the method further comprising:
   transmitting an indication of one or more second PRG parameters associated with a third network node.

24. The method of claim 22, further comprising:
   receiving a PRG parameter request,
      wherein transmitting the indication of the one or more PRG parameters includes transmitting the indication of the one or more PRG parameters based at least in part on the PRG parameter request.

25. The method of claim 24, wherein receiving the PRG parameter request includes receiving the PRG parameter request based at least in part on an interference associated with a user equipment (UE) satisfying an interference threshold.

26. The method of claim 22, further comprising:
   refraining, after transmitting the indication of the one or more PRG parameters, from transmitting another indication of the one or more PRG parameters.

27. The method of claim 22, wherein receiving the indication of the one or more PRG parameters includes receiving the indication of the one or more PRG parameters based at least in part on a periodicity associated with the indication of the one or more PRG parameters.

28. The method of claim 22, wherein receiving the indication of the one or more PRG parameters includes receiving the indication of the one or more PRG parameters based at least in part on a change in the one or more PRG parameters.

* * * * *